Jan. 3, 1967   J. T. MANCHESTER   3,295,499

ANIMAL AMUSEMENT AND EXERCISING DEVICE

Filed April 12, 1965

INVENTOR.
JAMES T. MANCHESTER

BY
Morgan, Finnegan, Durham & Pine
ATTORNEYS.

United States Patent Office 3,295,499
Patented Jan. 3, 1967

3,295,499
ANIMAL AMUSEMENT AND EXERCISING
DEVICE
James T. Manchester, Forrest Drive, Lloyd Neck,
Huntington, Long Island, N.Y. 14062
Filed Apr. 12, 1965, Ser. No. 447,497
6 Claims. (Cl. 119—29)

This invention relates to exercising and amusement devices for animals, and more particularly, to such amusement devices including a safety coupling which prevents injury to the animal.

Anyone owning a pet such as a cat or dog is well aware that they enjoy playing with objects dangling at the end of a cord. Often, they will be amused for hours repeatedly hitting the object with their paws and occasionally catching the object in their mouths. In the past, owners of pets would simply attach a cord to some suitable object attractive to the animal and then suspend it in some convenient manner without giving any thought to the possible danger involved. With these home made devices the cord may become wrapped around the neck of the pet. When this occurs, the animal becomes frightened and tends to bolt. This may result in serious injury or even the death of the pet.

This danger is eliminated in accordance with this invention by using a pressure responsive safety coupling for securing the cord to a stationary support. The safety coupling is desiged so that the cord is properly secured to the stationary support during a normal use. However, in the event that the animal becomes fouled with the cord, the increased pull on the cord which may result causes the safety coupling to release thereby preventing any injury to the pet.

The manner in which this is accomplished is set forth more fully in the following specification which describes a few illustrative embodiments within the scope of this invention. The drawings form a part of this specification wherein.

Figure 1:
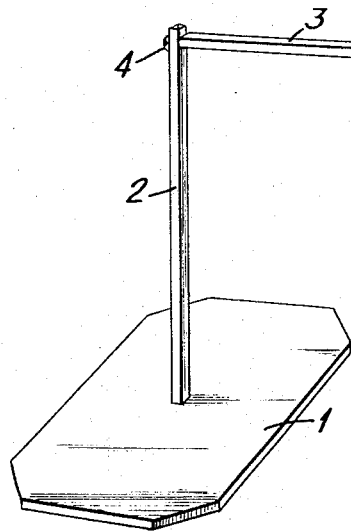
FIGURES 1 and 2 are perspective views illustrating two embodiments of the invention.

The animal exercising and amusement device in accordance with this invention is shown in FIGURE 1 inluding a horizontal base 1 and a support structure extending upwardly and outwardly therefrom. The support structure includes a vertical member 2, secured to base 1 in any suitable fashion, and a horizontal arm 3 secured near the upper end of member 2 by means of a screw 4. A rubber ball 10 is supported dangling from the free end of arm 3 by means of a cord 9.

The base member can be fabricated from wood, or in the more expensive models, may be made from marble. The base should be of a size and weight which is adequate to maintain the device upright while being used. Any object which is attractive to animals can be used in place of the ball 10. The cord 4 may be of a non-stretching type, but is preferably elastic, as for example a strip of rubber. Arm 3 should be so dimensioned that the pet will have an unobstructed playing area beneath ball 10.

Pets such as cats and dogs normally amuse and exercise themselves by repeatedly hitting ball 10 with their paws and occasionally catching the ball in their mouth. There is a danger while playing with the device, the cord 9 may become wound around the neck of the animal. When this occurs the animal may become frightened and injury or death may result. This danger is eliminated by use of a magnetic pressure responsive safety coupling in accordance with this invention for securing cord 9 to arm 3.

Figure 3:
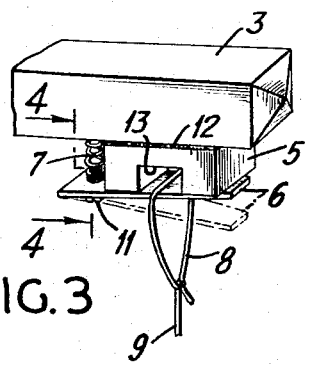
FIGURE 3 is an enlarged perspective view showing the details of the safety coupling.
Figure 4:
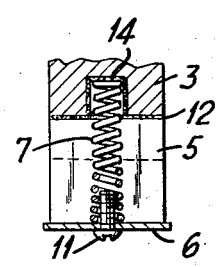
FIGURE 4 is a cross-sectional view taken along line 4—4 of the safety coupling shown in FIGURE 3.

The safety coupling is shown in greater detail in FIGURES 3 and 4 and includes a U-shaped permanent magnet 5 secured on the lower surface of arm 3 near the free end. The permanent magnet can be secured conveniently by means of an adhesive layer 12 which can be epoxy cement. Preferably, arm 3 is constructed from a non-magnetic material such as aluminum. Associated with permanent magnet 5 is an armature 6 which is attracted by the permanent magnet and is normally in the position shown in the solid lines of FIGURE 3. A loop 8 is formed at the end of cord 9 and is adapted to surround armature 6. Thus a portion of loop 8 is normally located in the opening 13 defined between the legs of permanent magnet 5.

Under normal circumstances the cord is secured to arm 3 because of the magnetic force acting on armature 6. However, if the pressure is increased sufficiently, armature 6 is pulled away from the magnet thereby permitting the cord to slide off one end. In this manner, when the pull on the cord becomes too great, the cord is automatically released.

It is desirable that the armature be secured so that it cannot become lost when the cord is released. Accordingly, armature 6 is pivotably connected to arm 3 by means of a spring 7. The spring is secured to one end of armature 6 by means of a screw 10, and the other end of the spring is located within a recess 14 and secured to arm 3 by a suitable adhesive such as epoxy cement. When the cord is released, armature 6 drops down into the position shown in dotted lines in FIGURE 3. Loop 8 slides off the end of the armature and thereafter the magnetic forces return the armature to the initial position.

Figure 5:
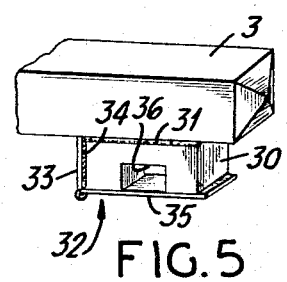
FIGURES 5 through 7 are enlarged perspective views of other safety coupling structures attached to the device as shown in FIGURE 1.

Another embodiment of the magnetic safety coupling is shown in FIGURE 5 including a U-shaped permanent magnet 30 secured to arm 3 by means of adhesive layer 31. The associated magnetic armature 35 forms one arm of a hinge 32, the other arm being secured to one side of the permanent magnet by means of an adhesive layer 34. The loop 8 of the cord normally surrounds armature 36 at a point between the legs of the permanent magnet. When a sufficiently strong pull is exerted on the cord, the armature portion of the hinge pivots to release the loop and thereafter returns to the initial position due to the magnetic forces of permanent magnet 30.

Figure 6:
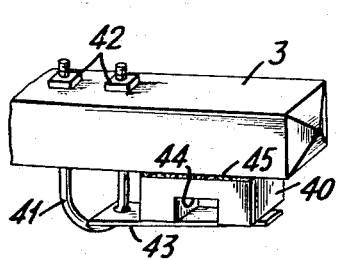

Another embodiment of the invention is shown in FIGURE 6 which also uses a hinge like arrangement for the armature. Armature 43 is provided with an aperture at one end which accommodates the shaft of the U-bolt 41. The U-bolt is fastened to arm 3 by nuts 42. The associated permanent magnet 40 is secured to arm 3 by an adhesive layer 45. The loop 8 normally surrounds the armature at a point between the legs of the permanent magnet. The combination of U-bolt 41 and armature 43 operates essentially like a hinge and therefore the operation is similar to that previously described with respect to FIGURE 5.

Figure 7:
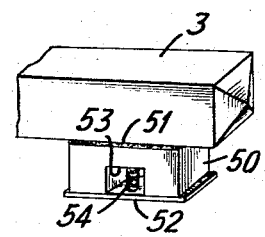

It is also possible to construct the magnetic coupling by using a spring 54 positioned between the legs of the permanent magnet as illustrated in FIGURE 7. Spring 54 may be secured to the armature and permanent magnet in any suitable fashion. Permanent magnet 50 is secured to arm 3 by use of an adhesive layer 51. The loop of the cord is located within opening 53 between the legs of the permanent magnet and may be positioned on either side of spring 54. The cord is released when the pull exceeds a predetermined amount since this pulls the armature away from the magnet and permits the loop to slide off one end.

Figure 2:
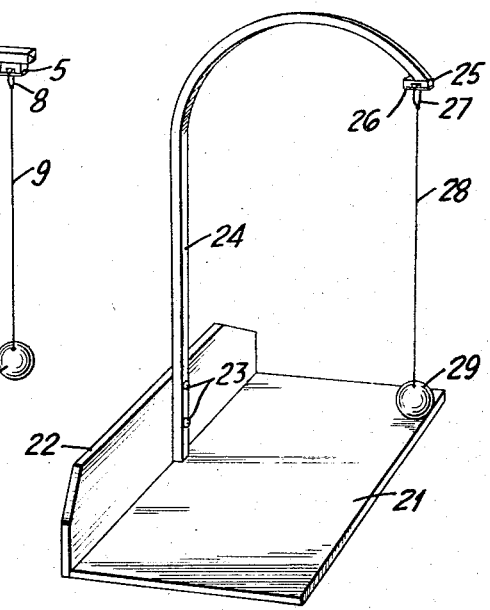

An alternative structure for the amusement and exercising device is shown in FIGURE 2 wherein the base includes a horizontal member 21 and a back-board member 22 extending upwardly and secured to one edge of base member 21. The structure which supports ball 29 and cord 28 is made from a single piece of material which extends upwardly and then curves outwardly. The support member 24 is simply secured to back-board member 22 by means of a pair of screws 23. A loop 27 is formed at one end of cord 28 and surrounds the armature 26 associated with a U-shaped permanent magnet 25 secured to the free end of member 24.

While only a few illustrative embodiments of the invention have been shown in detail it should be obvious that there are numerous variations within the scope of the invention. The invention is more particularly defined in the appended claims.

What is claimed is:

1. In an animal exercising and amusement device the combination of a base member; a support structure secured to said base member extending upwardly and outwardly therefrom; an object attractive to animals; a cord secured to said object for suspending the same within easy reach of animals using the device; a U-shaped permanent magnet secured to the free end of said support structure; a magnetic armature associated with said magnet; said cord having a loop at one end, said loop being adapted to normally surround said armature at a point between the legs of said permanent magnet whereby said cord may be released by sliding off one end of said armature when excessive pressure is applied.

2. An animal exercising and amusement device in accordance with claim 1 further comprising means for pivotably securing said armature for movement relative to said permanent magnet.

3. An animal exercising and amusement device in accordance with claim 2 wherein said means includes a spring connected between said armature and said support structure.

4. An animal exercising and amusement device in accordance with claim 2 wherein said means is a spring connected between said armature and said permanent magnet.

5. An animal exercising and amusement device in accordance with claim 2 wherein said means is a hinge which pivotably secures said armature to said permanent magnet.

6. An animal exercising and amusement device in accordance with claim 2 wherein said means is a hinge which pivotably secures said armature to said support structure.

References Cited by the Examiner

UNITED STATES PATENTS

| | | | |
|---|---|---|---|
| 2,096,078 | 10/1937 | Windson | 119—29 |
| 2,194,736 | 3/1940 | De Bruler | 119—29.5 |
| 2,833,244 | 5/1958 | Bohlman | 119—29 |
| 3,086,268 | 4/1963 | Chaffin | 119—106 X |

SAMUEL KOREN, *Primary Examiner.*

HUGH R. CHAMBLEE, *Examiner.*